United States Patent
Schoenfeld et al.

(10) Patent No.: US 9,033,639 B2
(45) Date of Patent: May 19, 2015

(54) GRAIN BIN ACCESS DOOR AND DISCHARGE CHUTE SYSTEM AND METHOD

(71) Applicants: Roger H. Schoenfeld, Joplin, MO (US); Ryan H. Schoenfeld, Joplin, MO (US)

(72) Inventors: Roger H. Schoenfeld, Joplin, MO (US); Ryan H. Schoenfeld, Joplin, MO (US)

(*) Notice: Subject to any disclaimer, the term of this patent is extended or adjusted under 35 U.S.C. 154(b) by 242 days.

(21) Appl. No.: 13/776,437

(22) Filed: Feb. 25, 2013

(65) Prior Publication Data

US 2013/0223960 A1  Aug. 29, 2013

Related U.S. Application Data

(60) Provisional application No. 61/603,164, filed on Feb. 24, 2012.

(51) Int. Cl.
| | |
|---|---|
| *B65G 65/00* | (2006.01) |
| *B65G 65/40* | (2006.01) |
| *B65D 88/54* | (2006.01) |
| *B65D 90/00* | (2006.01) |
| *B65D 90/60* | (2006.01) |
| *B65G 65/46* | (2006.01) |
| *B65D 88/68* | (2006.01) |

(52) U.S. Cl.
CPC ............ *B65G 65/40* (2013.01); *B65D 88/54* (2013.01); *B65D 90/008* (2013.01); *B65D 90/60* (2013.01); *B65G 65/466* (2013.01); *B65D 88/68* (2013.01)

(58) Field of Classification Search
USPC ..................... 414/292, 288, 318, 321, 684.3
See application file for complete search history.

(56) References Cited

U.S. PATENT DOCUMENTS

| | | | |
|---|---|---|---|
| 4,347,922 | A | 9/1982 | Curry et al. |
| 4,875,820 | A | 10/1989 | Lepp et al. |
| 5,601,181 | A | 2/1997 | Lindhorst |
| 6,299,387 | B1 | 10/2001 | Andersson |
| 6,350,197 | B1 | 2/2002 | Cooksey et al. |
| 6,499,930 | B1 | 12/2002 | Dixon |
| 6,851,847 | B2 | 2/2005 | Sukup |
| 7,004,305 | B2 | 2/2006 | Schaefer |
| 7,070,133 | B1 | 7/2006 | Harlow |
| 7,544,031 | B2 | 6/2009 | Kaeb et al. |
| 2008/0131242 | A1 | 6/2008 | Duffy et al. |

OTHER PUBLICATIONS

"About the Sump Saver", http://sumpsaver.com/about/, (2011).

*Primary Examiner* — Saul Rodriguez
*Assistant Examiner* — Emery Hassan
(74) *Attorney, Agent, or Firm* — Law Office of Mark Brown, LLC; Christopher M. DeBacker; Mark E. Brown

(57) ABSTRACT

A grain bin access door and chute system that can be retrofitted into existing grain bins or installed in new grain bins. The access panel includes an outer door and an inner door and allows a user to quickly access and assess the grain within a bin without fear of falling into the grain or through the crust of grain which can form a bridge on the top of grain. The access door includes a lever-controlled chute door and pipe-chute connection. This allows grain to be gravity fed into awaiting grain trucks or rail cars without using a more dangerous grain auger and without relying on outside energy sources. Additionally, grain transferred through a gravity-fed method is less likely to become damaged than grain transferred through a grain auger. An optional grain agitator may likewise be installed within the grain bin.

18 Claims, 8 Drawing Sheets

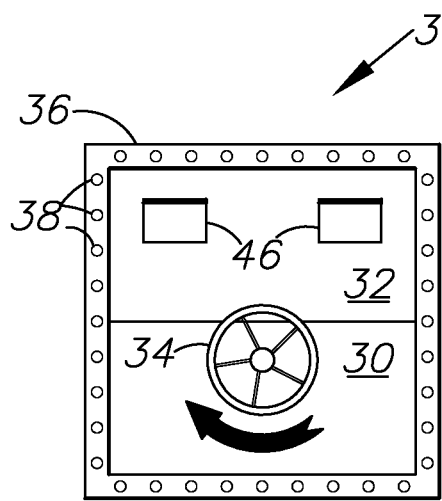
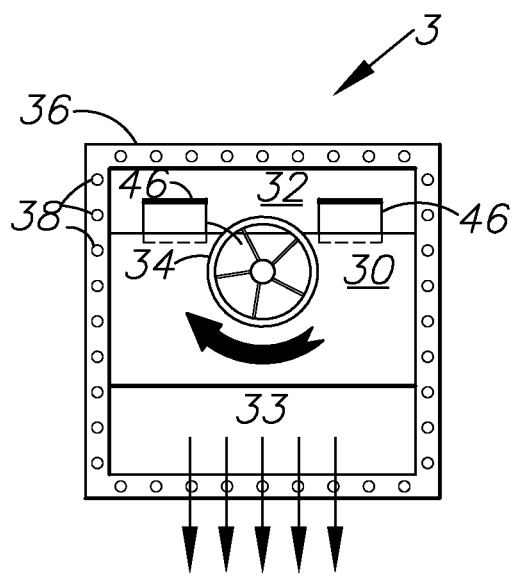
FIG.3A                FIG.3B
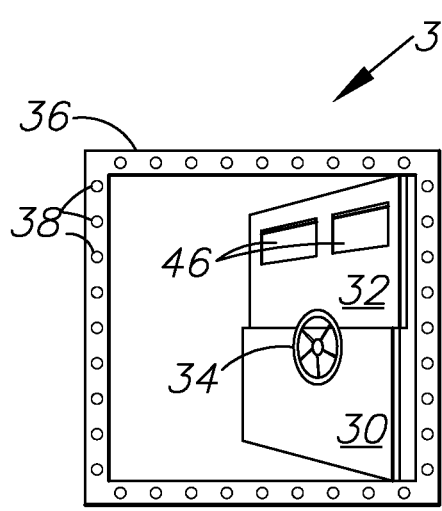
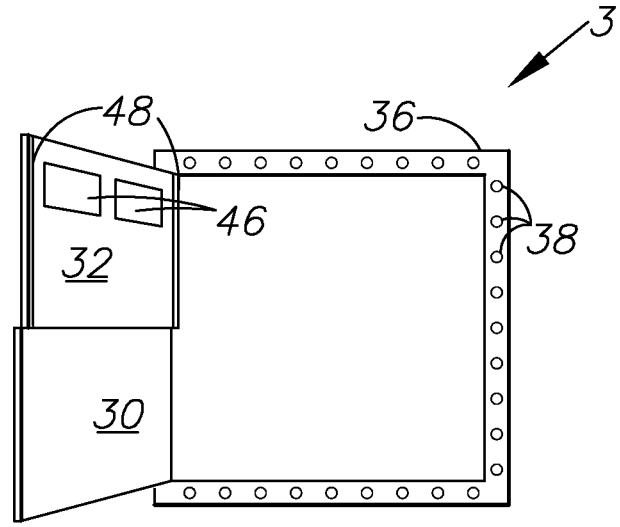
FIG.3C                FIG.3D

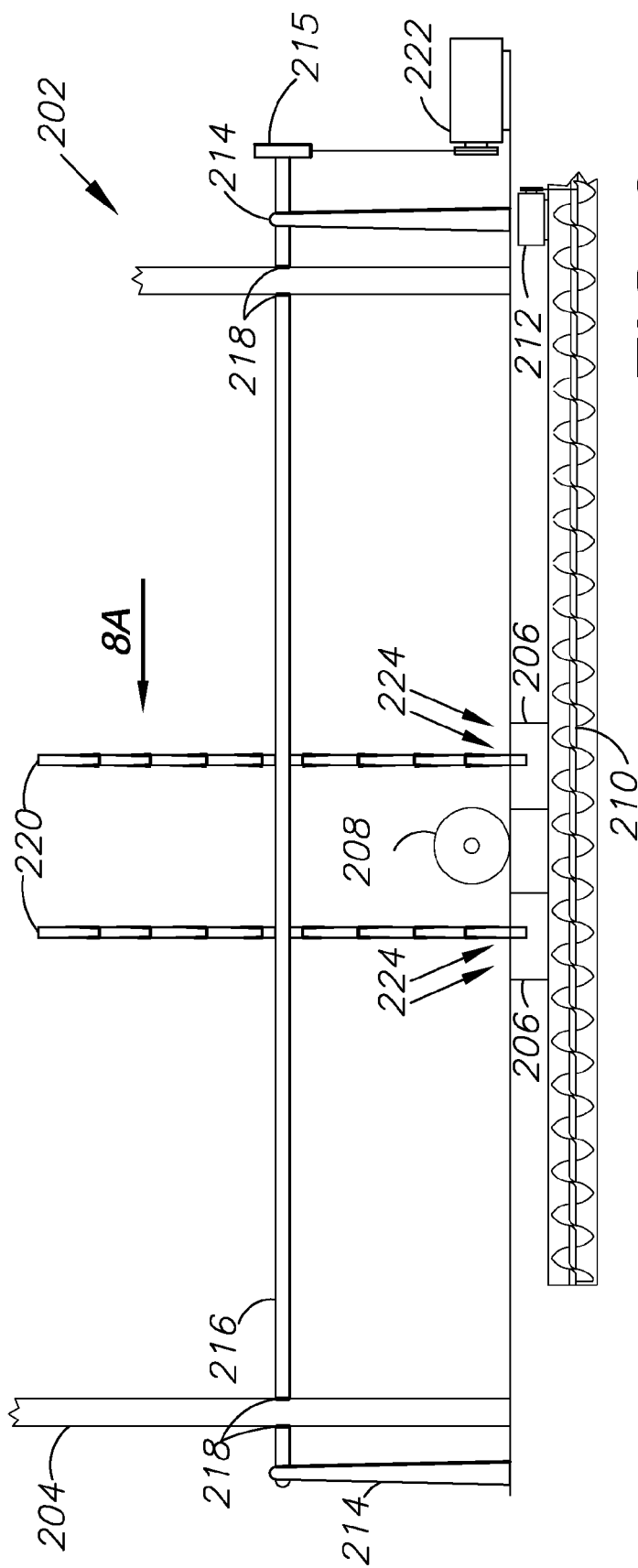
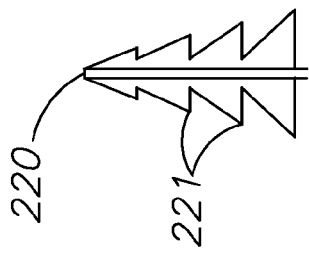
FIG. 8
FIG. 8A

GRAIN BIN ACCESS DOOR AND DISCHARGE CHUTE SYSTEM AND METHOD

CROSS-REFERENCE TO RELATED APPLICATION

This application claims priority in U.S. Provisional Patent Application No. 61/603,164, filed Feb. 24, 2012, which is incorporated herein by reference.

BACKGROUND OF THE INVENTION

1. Field of the Invention

The present invention relates generally to a system and method for providing an alternative means for discharging grain from a grain bin, and more specifically to a specifically designed single or double access door and chute system providing an energy free, enhanced safety, multiple portal grain loading system with the ability to deal with clogged or crusted grain while minimizing waste and while also reducing the damage to the grain.

2. Description of the Related Art

Grain is typically stored in a grain bin prior to being transported to a remote location for processing, milling, or other purposes. Grain bins protect the grain from the elements and from pests. However, it is much simpler to load grain into a grain bin than it is to remove the grain from these bins and into transport vehicles, such as trucks or trains. Additional hazards also present themselves due to grain bin use. These hazards include but are not limited to a crust forming on the top or throughout the product, uneven emptying of the bin, the bin tipping or collapse, and the emptying augers becoming clogged. The greatest hazard of all is the temptation and need to enter the top of the grain bin from the top portal to remedy a problem.

Grain bin products are loaded into trucks and trailers by a system of augers. A large floor auger is beneath the floor of the bin on one side. It is filled by a center located sump drain and several smaller recessed port holes. The floor auger fills a second auger outside the grain bin that must raise the grain and fill the waiting transportation vehicle. The grain in the bin fills these augers by gravity flow. If there are no problems that exist with the grain, it will empty by this method until no further grain will flow. This will result in the remaining grain in the bin forming a steep 45 degree slope that will need to be unloaded by a third auger known as a sweep auger. The sweep auger needs to be started once it is uncovered by the grain flowing through the smaller recessed port holes under the sweep auger. It then circles the inside circumference of the grain bin with the center pivot located to empty the remaining grain into the sump of the floor auger. The resource system requires substantial electric for both of the grain bin augers, diesel or gas for the tractor to operate the lift auger and one to two people to operate and manage the equipment safely. The grain must flow problem free. The side walls of the grain bin must not fail.

A sweep auger is often placed on the floor of the grain bin to ensure no grain is left behind during a loading process. A sweep auger is a portable unguarded screw auger attached to a pivot that circles the perimeter of the storage bin and conveys grain into a center sump(s) located in the bin floor. The sumps are typically recesses located in the center of the bin. A second auger located below the floor then transports the grain to the exterior of the bin and allows the grain to be loaded by using a chute. The sweep auger cannot function until grain within the grain bin is at a level low enough to not obstruct the auger.

Grain augers have caused a number of injuries and deaths in recent years. Injuries range from lacerations, caused by falling onto or by lifting and moving the auger, to people becoming entrapped and crushed or suffocated after falling through the top layer of grain which can form a "crust" when moisture is present. Sweep augers also tend to cause a "funnel" effect when they are in operation, which can quickly draw a person down into the grain.

A grain bridge can form when grain on the surface is moldy or is frozen together to form a hard, thick crust. When grain is unloaded from a bin with a surface crust, a hollow cavity forms underneath the grain bridge. If anyone enters the bin and attempts to walk on the crusted surface, the additional weight will cause the crust to collapse and the individual could be partially or completely submerged instantly. The shifting grain can move the victim four to five feet from the point of entry where the victim was last seen, making it difficult to determine exactly where the victim is located.

It is therefore typically not recommended that a person enter a grain bin while grain remains in the bin. There is a need for an alternative method to both unload the grain and access the grain bin while grain remains in the bin without presenting danger to the user.

Heretofore there has not been available a grain bin access door and chute system with the advantages and features of the present invention.

SUMMARY OF THE INVENTION

The present invention relates to a grain bin access door and chute system that can be retrofitted into existing grain bins or installed in new grain bins. The access panel includes an outer door and an inner door. This access panel allows a user to quickly access and assess the grain within a bin without fear of falling into the grain or through the crust of grain which can form a bridge on the top of grain. An opening is present in the inner door to allow sampling of the grain without requiring complete access to the grain bin interior. The access door includes a lever-controlled chute door and pipe-chute connection. This allows grain to be gravity fed into awaiting grain trucks or rail cars without using a more dangerous grain auger and without relying on outside energy sources. Additionally, grain transferred through a gravity-fed method is less likely to become damaged than grain transferred through a grain auger.

An alternative embodiment of the presented invention includes an access door and chute placed on opposing sides of the grain bin to prevent grain from stacking up against one side of the grain bin, which could cause the bin to tip.

Another alternative embodiment of the present invention includes a feeder auger placed above the access door. This auger spans the length of the grain bin and helps to prevent grain from stacking up against one side of the grain bin, which could cause the bin to tip.

Access to the access door is reached using collapsible steps, a temporary ladder, or some other manner of access. For the safest approach, a set of steps is semi-permanently affixed to a platform located next to the access door.

A further aspect of the present invention relates to a grain agitator capable of preventing accretion, aggregation, accumulation, and clogging of grain within a typical grain bin. Grain can clump together and form a crust capable of blocking access ports beneath the grain bin which are used to feed the grain into a floor auger, which then allows the grain to be loaded into transport vehicles. It is an aspect of an embodiment of the present invention to ensure that the grain does not clump together.

It is a further aspect of an embodiment of the present invention to ensure that the grain bin floor grates remain unclogged during the loading procedure.

It is a further aspect of an embodiment of the present invention to that the agitator will function without the need to remove an existing sweep auger from within the grain bin.

BRIEF DESCRIPTION OF THE DRAWINGS

The drawings constitute a part of this specification and include exemplary embodiments of the present invention illustrating various objects and features thereof.

FIG. 3A is a detailed front elevational view of an access panel inner door in a closed position.

FIG. 3B is a detailed front elevational view of an access panel inner door in a partially-opened position.

FIG. 3C is a detailed front elevational view of an access panel inner door opening on a hinged side as viewed from a position external to the grain bin.

FIG. 3D is a detailed front elevational view of an access panel inner door opening on a hinged side as viewed from a position internal to the grain bin.

FIG. 8 is a sectional view of a grain bin silo containing an embodiment of the present invention.

FIG. 8A is a detailed view taken about the arrow of FIG. 8.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment or Aspect Grain Bin Access Door and Chute System 2

Figure 1:
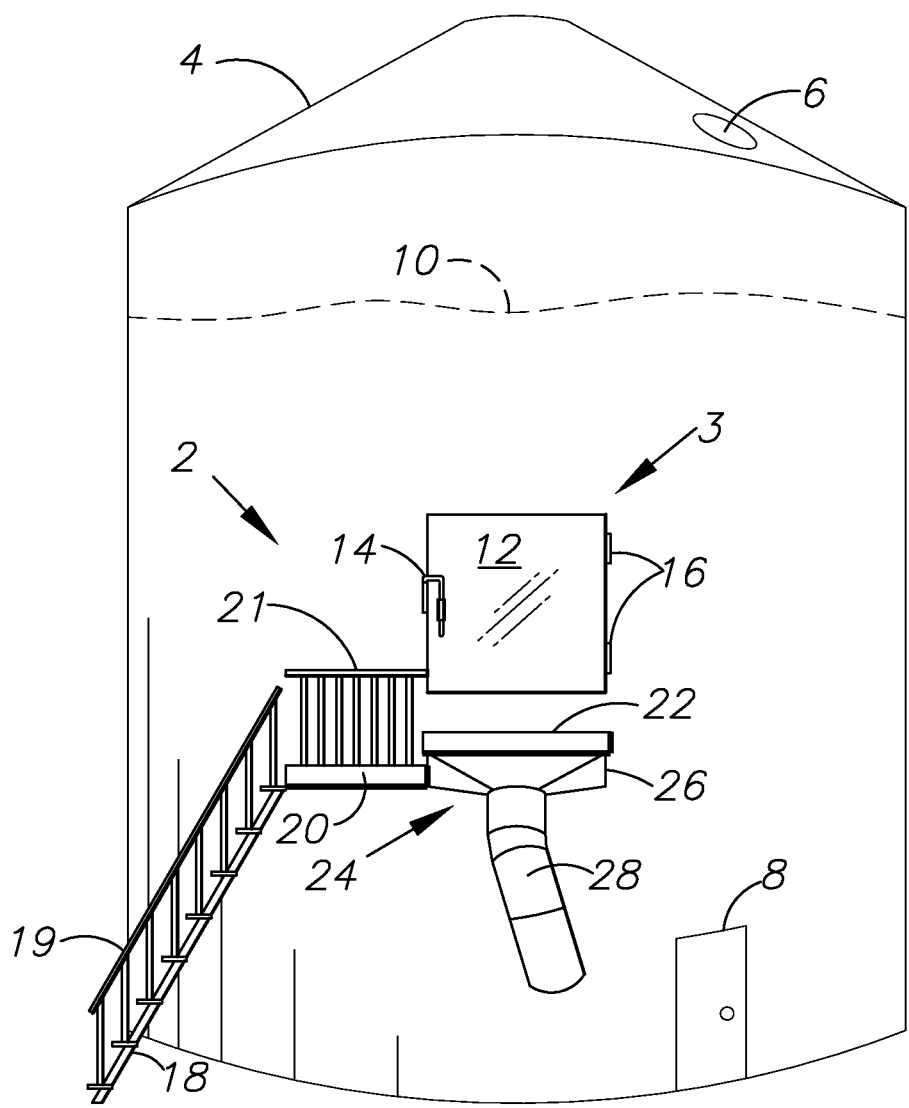
FIG. 1 is a front elevational view of an embodiment of the present invention shown with a pipe chute attached.

Referring to the drawings in more detail; the numeral 2 generally refers to a grain loading system which can be affixed to an existing grain bin silo 4 or included with a new grain bin unit. FIG. 1 shows a typical grain bin 4 including a roof access hatch 6, a standard side access door 8, and a grain level 10. The grain loading system 2 comprises a number of pieces which allow the grain to be loaded into a truck or railcar for shipment to a remote location. The main components are the access panel subsystem 3 and the grain chute subsystem 24.

An access panel subsystem 3 which includes an outer access door 12 and a pair of inner access panels 30, 32, is affixed to the grain bin 4 via a frame 36. The frame may be affixed to the grain bin wall by using rivets 38 or by some other semi-permanent means. The two door system prevents weather and moisture from entering the grain bin through the access panel 3. Moisture can cause the grain stored within the bin to crust over, clump together, and ultimately to rot. The ultimate goal of the present invention is to provide a grain loading means and an access means while preventing grain degradation.

Figure 2:
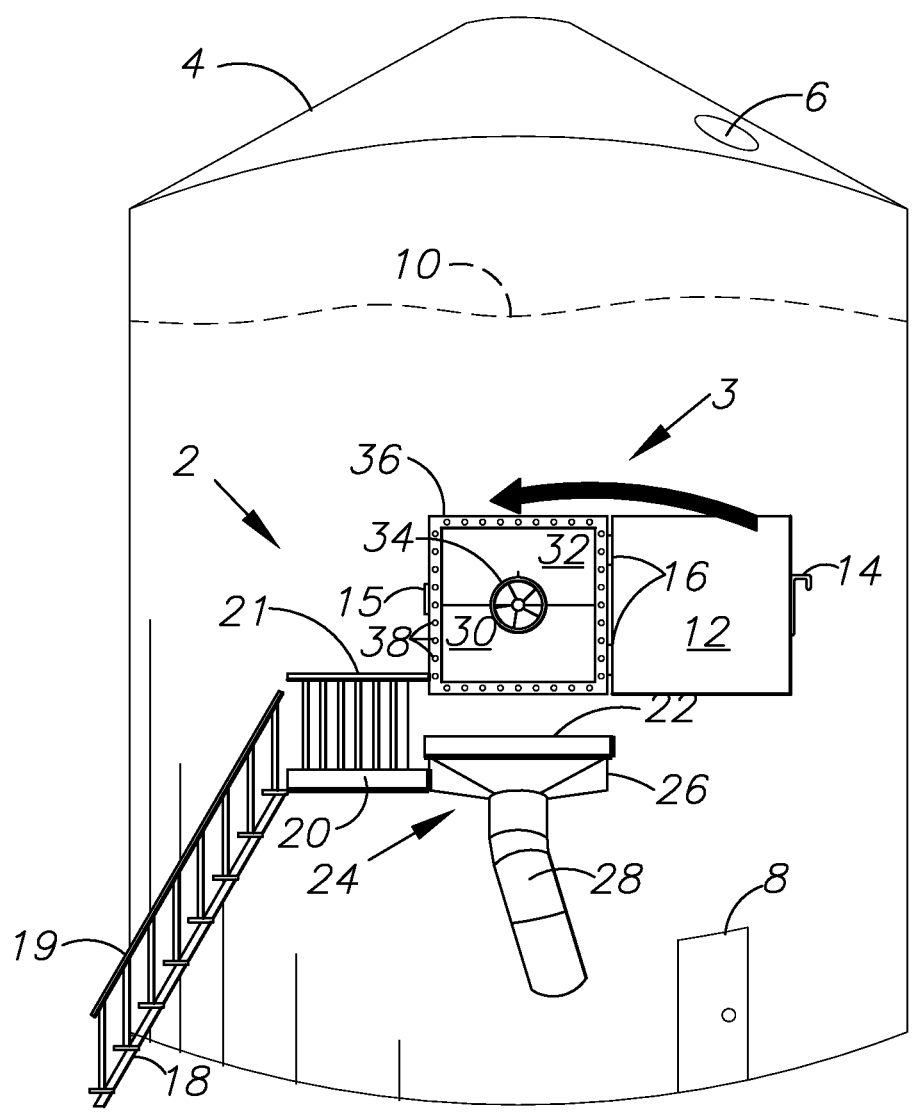
FIG. 2 is a front elevational view of an embodiment of the present invention shown with an open exterior access door.

The exterior access door 12 includes a pair of hinges 16, a latch pin 14, and a latch pin receiver 15. The exterior door acts as a second layer of protection by preventing moisture from entering the grain bin 4, and preventing grain from exiting the grain bin. As shown in FIG. 2, when the exterior door is swung into an open position the interior upper 32 and lower 30 doors are accessible. A wheel 34 or other mechanism is used to open the interior doors. A pair of sample doors 46 are placed into the upper access panel 32. This opening allows testing of the grain to determine moisture level or grain level 10 while preventing the grain from actively exiting the bin 4 and without requiring full access to the bin. Having two sample doors allows the user to insert a grain vacuum for cleaning the grain into one of the doors while maintaining the second door for periodic grain testing.

As shown in FIGS. 3A and 3B, when activated, the lower panel 30 slides up in front of the upper panel 32. If the grain level 10 is above the level of the interior panels 30, 32, the grain 33 will be fed via gravity out the doors where it can be loaded into a transport vehicle. The lower panel 30 can be raised or lowered to control the flow of grain 33. The lower panel follows a pair of tracks 48 mounted on the rear face of the upper panel 32, as shown in FIG. 3D.

As shown in FIGS. 3C and 3D, the internal panels may optionally attach to the frame 36 via a hinged connection. This allows the panels to swing inward and allow a person to access the internal space of the grain bin. This cannot be accomplished as long as the grain level 10 is higher than the access panel subsystem 3.

The grain chute subsystem 24 includes at least a funnel 26 and a pipe chute 28 comprised of multiple sections. A porous floor grate 22 is mounted below the access panel subsystem 3 and adjacent to the standing platform 20. This grate is made of steel or other suitable material such that a person may walk on top of the grate to access the interior of the grain bin 4. The grate must also be porous enough to allow flowing grain to pass through the grate into the funnel 26 and through the pipe chute 28 to be loaded into a transport vehicle.

Larger pieces of clumped grain will be captured by the grate and effectively filtered out. An access stair 18 is affixed to the platform 20 and allows access from the ground. The access stair 18 optimally includes a safety rail 19. The platform 20 similarly should include a safety rail 21.

The standing platform 20 allows a user to clear clumped and rotten grain from the grate 22 while grain is exiting the grain bin and entering the funnel 26.

Figure 4:
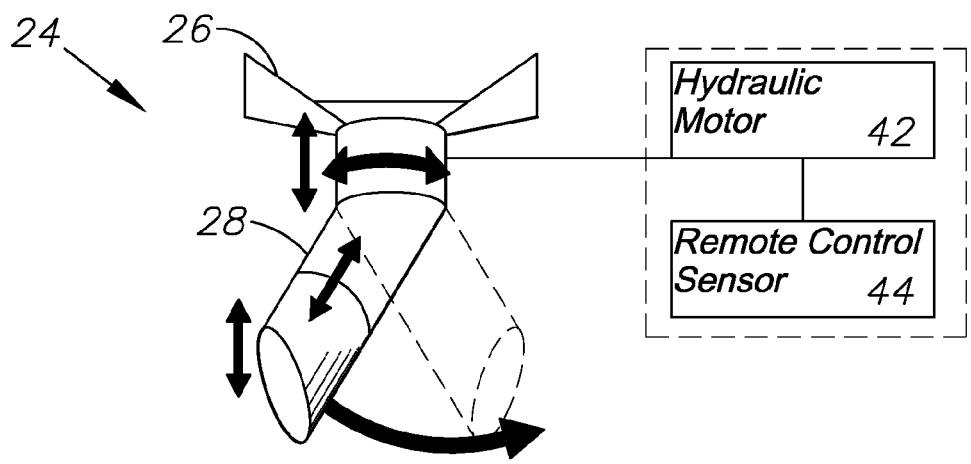
FIG. 4 is a detail elevational view demonstrating the mobility of the pipe chute.

As shown in FIG. 4, the chute subsystem 24 should be repositionable to allow loading of grain into transport vehicles with little effort. The pipe chute 28 may be made of multiple sections. At least one section may contain a hydraulic motor 42 which is remotely controlled. A preferred embodiment will include a hydraulic subsystem connecting to most or all of the pipe chute 28 sections. The hydraulic motor and subsystem are capable of controlling the movement of each pipe chute section.

A remote control sensor 44 is connected to said hydraulic motor 42 and subsystem. The sensor is capable of receiving wireless signals from a remote source which provide instructions for moving the pipe chute 28. Signals are received by a remote control sensor 44 and fed to the hydraulic motor 42, which moves the chute in at least one direction. A remote control unit is preferable because the chute will be located some distance off of the ground and if grain were to spill, the user should be as far from the chute as possible to prevent harm.

The pipe chute 28 should be capable of a wide range of movement, as indicated by the arrows in FIG. 4. Ideally the chute will be capable of rotating at least 180°, extending, retracting, raising, and lowering at will. This ensures that the system 2 will accommodate transport vehicles of all shapes and sizes, and grain bins 4 of all shapes and sizes. It should be further noted that the system 2 can be placed at any height on the wall of a grain bin. The higher the system is placed, the less grain can be gravity fed through the system.

III. Alternative Embodiment Access Panel Subsystem 153

Figures 5A, 5B:
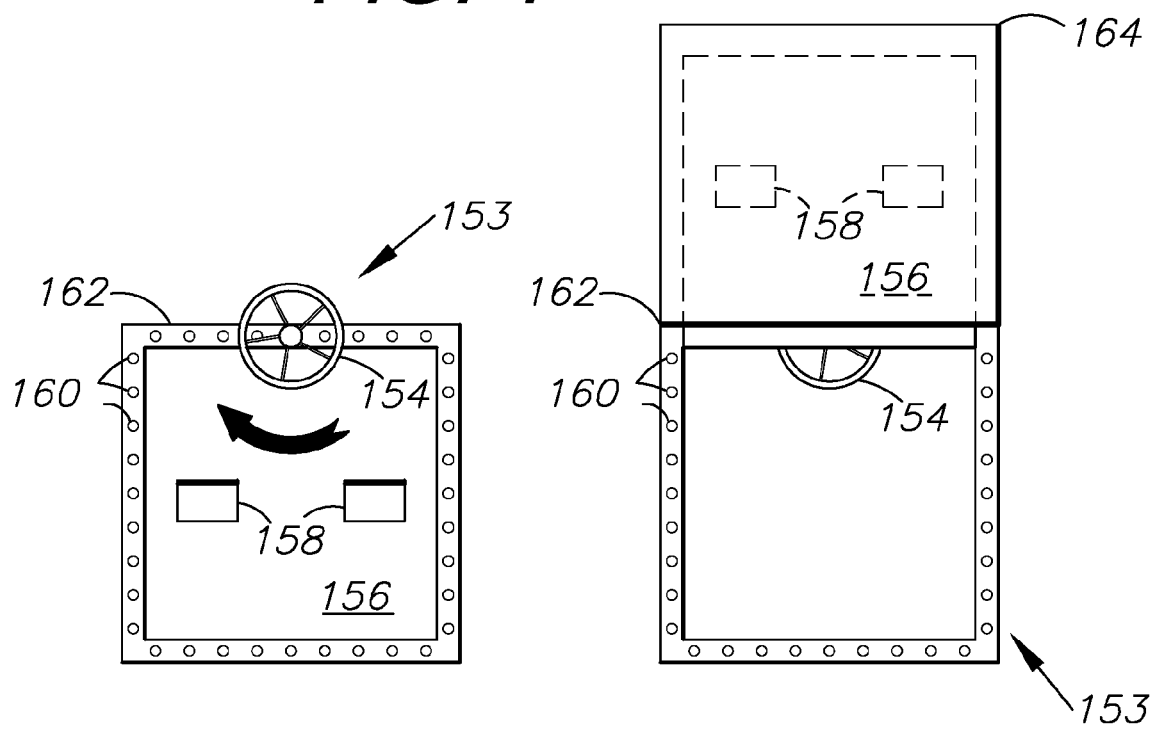
FIG. 5A is a detailed front elevational view of an alternative embodiment access panel inner door in a closed position.
FIG. 5B is a detailed front elevational view of an alternative embodiment access panel inner door in a partially-opened position.

As shown in FIGS. 5A and 5B, the internal access panel 156 may be formed from only a single panel. The access panel 156 includes the sample access doors 158 and is affixed to a frame 162 which is connected to the grain bin 4 via rivets 160 or some other connection means. An access panel door handle wheel 154 is mounted on or near the frame. This wheel controls the access panel, allowing the panel to be raised or lowered. This allows the user to control the flow of grain exiting the grain bin, and also allows complete access to the internal space of the grain bin 4 when fully opened. A box 164 affixed to the internal face of the grain bin 4 receives the internal access panel 156 as it is being raised. The box 164 ensures that grain does not pour into the space between the door and the grain bin, causing the door to jam.

IV. Alternative Embodiment Grain Loading System 52

Figure 6:
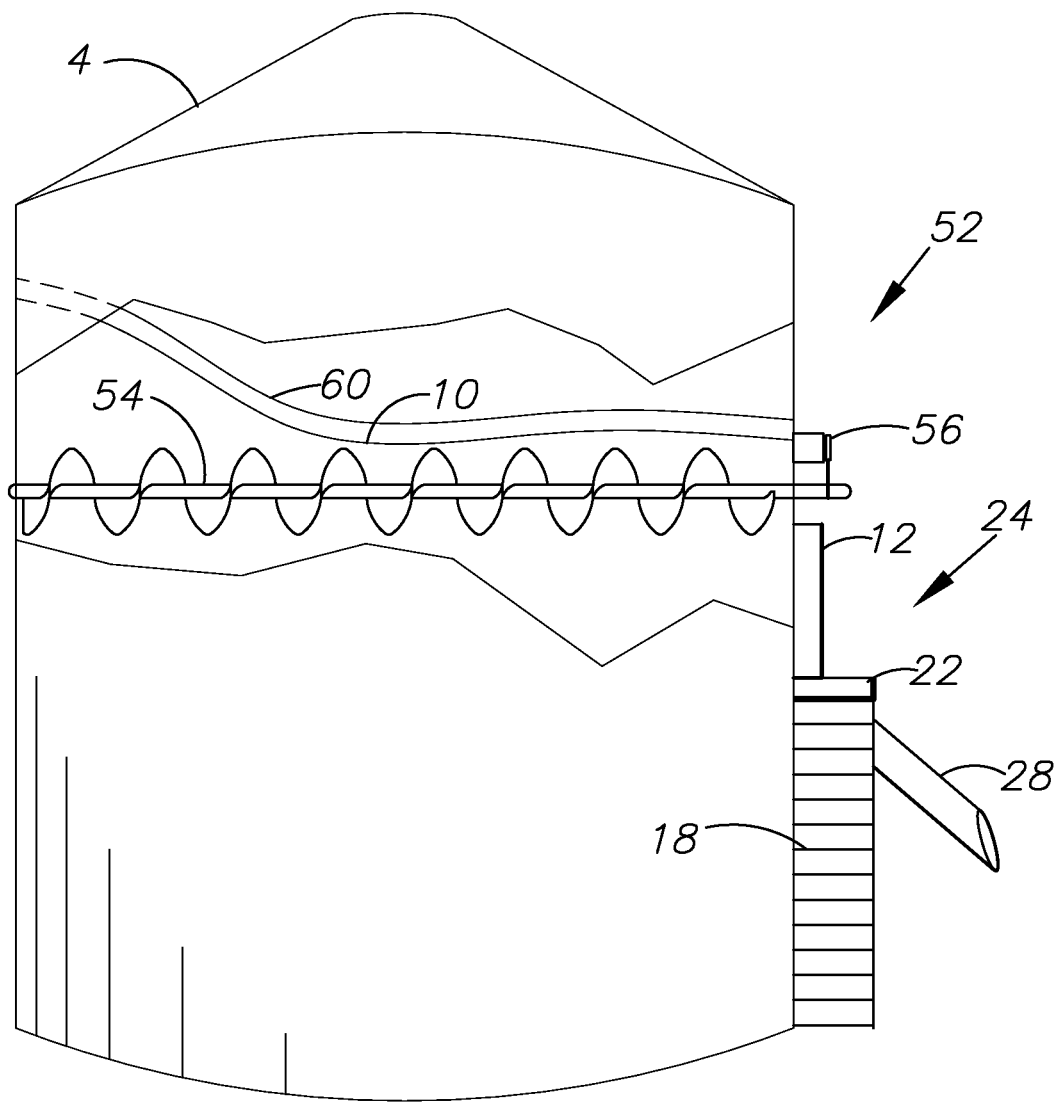
FIG. 6 is a side elevational view of an alternative embodiment of the present invention with a cut-away portion showing a transfer auger for evening stored grain placement.

FIG. 6 demonstrates an alternative embodiment system for loading grain using a pipe chute 28. During a normal procedure of loading grain via gravity using the pipe chute subsystem 24, grain within the load bin could become stacked against the opposite wall. Such an overload on one single wall of the bin could cause the entire bin to tip, spilling the remaining grain and potentially injuring persons or equipment nearby. Additionally, often a grain crust 60 may form at the top layer of the grain 10. This crust can remain even when the grain beneath it has been removed. Persons may accidentally attempt to walk on top of this crust or loosen the crust from beneath, resulting in injury or death to the user.

A large auger 54 spanning the diameter of the grain bin may be employed to stir up the grain along with the grain crust 60. Further, this auger can be used to evenly distribute grain throughout the grain bin 4 and prevent tipping. The auger will move grain from the extreme opposite side of the bin 4 to the side where the chute subsystem 24 is located. The auger 54 may be powered by an electric motor 56 or by another suitable powering means.

Additionally, the larger auger can be activated while grain is being loaded into the grain bin 4 to ensure that the grain is evenly distributed within the bin. This will prevent grain from piling unevenly during the loading process which may cause tipping or otherwise damage equipment.

V. Alternative Embodiment Grain Loading System 102

Figure 7:
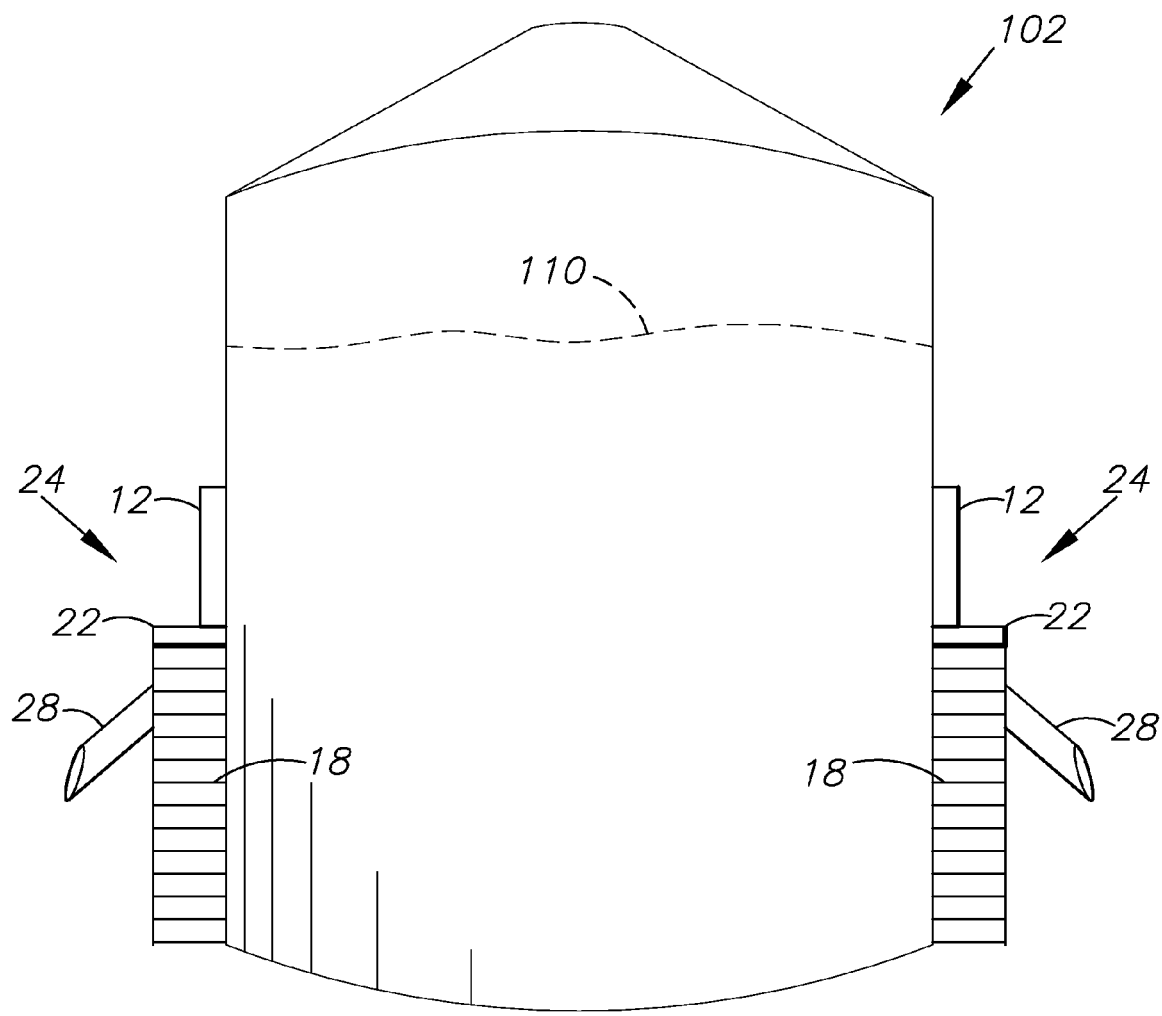
FIG. 7 is a side elevational view of an alternative embodiment of the present invention with two access doors and two pipe chutes.

FIG. 7 demonstrates yet another alternative embodiment system for loading grain using a pair of chute pipes 28 affixed to a pair of pipe chute subsystems 24 placed on opposing sides of a grain bin 4. As mentioned previously, grain may tend to stack against one side of a grain bin if only one pipe chute subsystem 24 is utilized. FIG. 6 demonstrates placing two of such systems onto a single grain bin 4 to ensure that the grain is evenly distributed from the grain bin, and the grain level 110 drops proportionally. Further, this alternative system allows two transport vehicles to be filled at the same time.

VI. Alternative Embodiment Grain Agitator 202

Referring to the drawings in more detail, the numeral 202 generally refers to a grain agitator system capable of stirring grain stored within a grain bin 204, breaking up grain which may have accumulated or clumped together, and unclogging grain floor sumps 206 which feed into the floor/sump auger 210. As shown in FIG. 8, a pair of mounts 214 are placed on the exterior of the grain bin and a rod axle 216 is run between the mounts, spanning the diameter of the grain bin 204. The rod axle is rotated by a motor 222. Seals 218 are placed where the rod 216 punctures the grain bin to prevent moisture from affecting the grain.

A number of blades 220 are mounted to the axle bar 216. These blades are shaped to blend the grain and to break up existing clumps. The blades 220 may include a number of teeth 221 to aid in breaking up the clumped grain as shown in FIG. 8A.

Typically, grain stored in the grain bin is gravity fed through the floor access grates 206 into the sump auger 210 which is powered by an electric or hydraulic motor 212 or by some other means. The grain follows the paths indicated by numeral 224 in FIG. 8. While a sweep auger 208 may be used when the grain is sufficiently low enough within the bin, grain clumps and crusts can cause issues for the sweep auger.

The blades 220 are optimally placed with relation to the floor access grates to ensure that the grates remain clear of clumped grain. The blades 220 also ensure that the grain remains evenly distributed within the grain bin to prevent tipping. Finally, the blades 220 can be used to break up a crust formed at the top surface of the grain within the grain bin.

Figure 9:
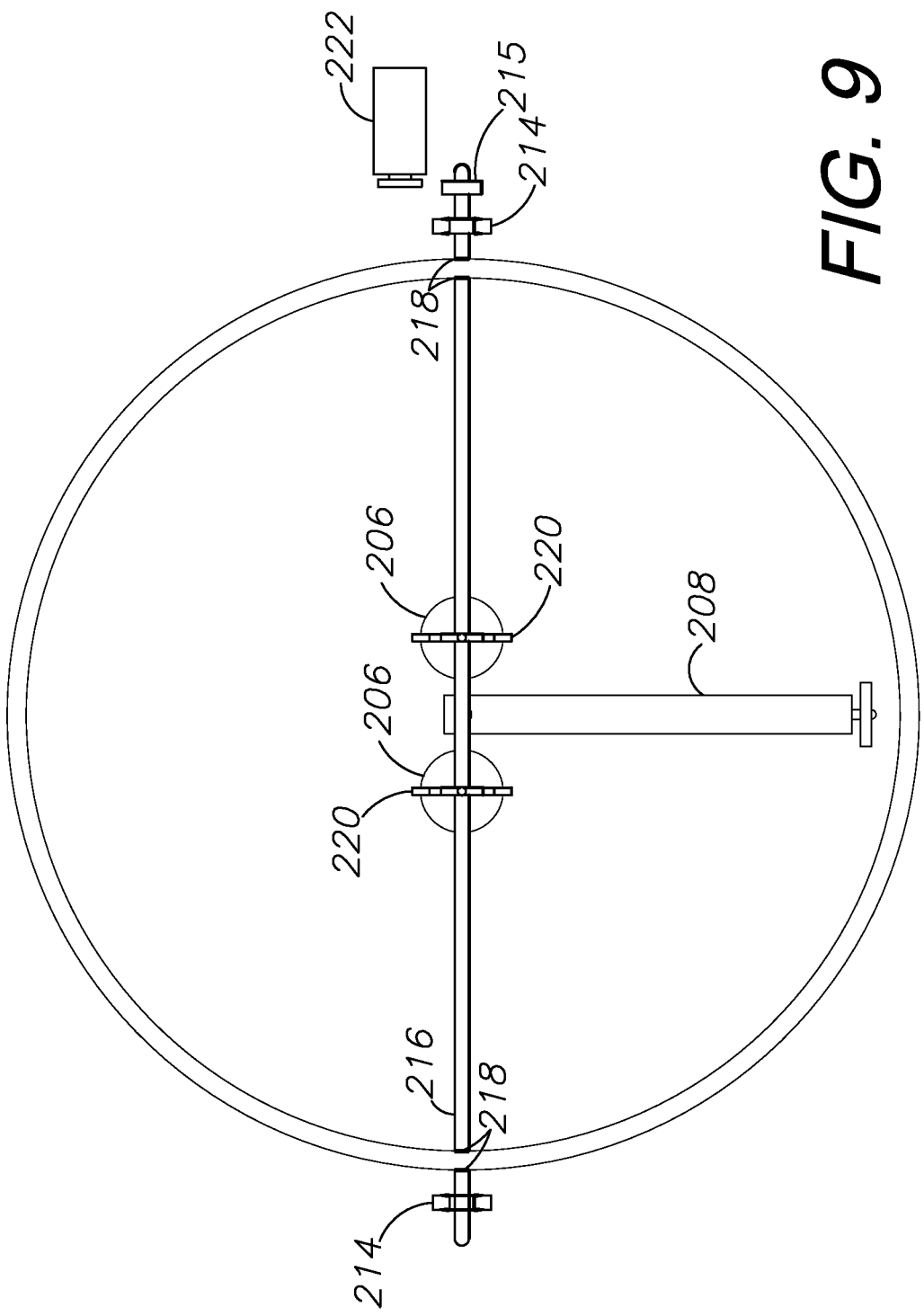
FIG. 9 is a top plan view of a grain bin silo containing an embodiment of the present invention.

The sweep auger 208 is placed perpendicular to the axle rod 216, as shown more clearly in FIG. 9. This allows the user to keep the sweep auger within the grain bin at all times, even when it isn't being used, while allowing the additional functionality of the grain agitator system 202.

The sweep auger may be activated when the grain is low enough. An indicator 215 located at the end of the axle rod or otherwise placed in relation to the agitator system 202 informs a user on the exterior of the grain bin 204 the direction of the blades 220 within the bin. This allows the user to ensure that the blades are rotated until they are parallel to the grain bin floor before the user starts the sweep auger 208.

It is to be understood that while certain embodiments and/or aspects of the invention have been shown and described, the invention is not limited thereto and encompasses various other embodiments and aspects.

Having thus described the disclosed subject matter, what is claimed as new and desired to be secured by Letters Patent is:

1. A system for unloading grain from a grain bin, the system comprising: a grain bin including an exterior face and an interior space; an access panel affixed to the wall of said grain bin, said access panel including a
frame, an interior door, and an exterior door;
said exterior door comprising a weather-proof door hingedly connected to said grain bin wall and capable of sealing said access panel;
a pipe chute including a proximal end and an distal end, said pipe chute further comprising a plurality of sections affixed to said grain bin and placed below said access panel; and
a series of steps leading up to a platform secured to said grain bin, and wherein said platform is adjacent to said access panel;
said exterior door hingedly connected to said grain bin, is adapted for providing a
weather-proof and pest-proof seal when said exterior door is in a closed position, and is further adapted for allowing access to said interior door when in an open position;
said interior door including an upper door portion with an inner face and an outer face, and a lower door portion with an inner face and an outer face, wherein said lower door portion is capable of being raised such that an opening is formed providing access to the interior of said grain bin and allowing grain stored within said grain bin to exit through said opening; and
said upper door portion including at least one sample access opening, said sample access opening adapted to allow access to grain stored within said grain bin for sampling or cleaning purposes.

2. The system according to claim 1, further comprising:
a funnel connected to the proximal end of said pipe chute; and
a grate mounted to said grain bin below said access panel and above said funnel.

3. The system according to claim 2, further comprising:
a hydraulic motor and hydraulic system connected to said plurality of pipe chute sections such that said pipe chute sections may be individually hydraulically controlled by said hydraulic system;
a remote control sensor electrically connected to said hydraulic motor and hydraulic system capable of receiving wireless commands from a remote source; and
wherein said pipe chute is repositioned based upon said wireless commands.

4. The system according to claim 1, wherein said interior door is hingedly connected to said grain bin such that the said interior door is capable of opening into the interior space of said grain bin when the level of grain stored within said grain bin is below said interior door.

5. The system according to claim 1, further comprising;
a pair of door tracks affixed to said inner door upper portion outer face;
a pair of rails affixed to said inner door lower portion inner face; and
wherein said rails engaged with said tracks such that said inner door lower portion is capable of being raised and lowered.

6. The system according to claim 1, further comprising:
wherein interior door is capable of being raised such that an opening is formed providing access to the interior of said grain bin and allowing grain stored within said grain bin to exit through said opening; and
said interior door including at least one sample access opening, said sample access opening adapted to allow access to grain stored within said grain bin for sampling or cleaning purposes.

7. The system according to claim 1, wherein said steps and said platform include safety rails adapted for preventing a user from falling from said steps or from said platform.

8. The system according to claim 1, further comprising:
an auger spanning the length of the interior space of said grain bin mounted to said grain bin above said access panel;
a motor connected to said auger, said motor capable of powering said auger for clockwise or counterclockwise rotation; and
wherein said auger is capable of shifting grain stored within said grain bin and breaking up grain which has become moist, clumped together, or which has formed a crust.

9. A system for unloading grain from a grain bin, the system comprising:
a grain bin including an exterior face and an interior space;
an access panel affixed to the wall of said grain bin, said access panel including a frame, an interior door, and an exterior door;
wherein said exterior door comprises a weather-proof door hingedly connected to said grain bin wall and capable of sealing said access panel;
said exterior door adapted for providing a weather-proof and pest-proof seal when said exterior door is in a closed position, and is further adapted for allowing access to said interior door when in an open position;
said interior door including an upper door portion with an inner face and an outer face, and a lower door portion with an inner face and an outer face, wherein said lower door portion is capable of being raised such that an opening is formed providing access to the interior of said grain bin and allowing grain stored within said grain bin to exit through said opening;
said upper door portion including at least one sample access opening, said sample access opening adapted to allow access to grain stored within said grain bin for sampling or cleaning purposes;
wherein said interior door is hingedly connected to said grain bin such that said interior door is capable of opening into the interior space of said grain bin when the level of grain stored within said grain bin is below said interior door;
a pipe chute including a proximal end and an distal end, said pipe chute further comprising a plurality of sections affixed to said grain bin and placed below said access panel;
a funnel connected to the proximal end of said pipe chute;
a grate mounted to said grain bin below said access panel and above said funnel;
a hydraulic motor and hydraulic system connected to said plurality of pipe chute sections such that said pipe chute sections may be individually hydraulically controlled by said hydraulic system;
a remote control sensor electrically connected to said hydraulic motor and hydraulic system capable of receiving wireless commands from a remote source;
wherein said pipe chute is repositioned based upon said wireless commands; and
a series of steps leading up to a platform secured to said grain bin, and wherein said platform is adjacent to said access panel.

10. The system according to claim 9, further comprising;
a pair of door tracks affixed to said inner door upper portion outer face;
a pair of rails affixed to said inner door lower portion inner face; and
wherein said rails engaged with said tracks such that said inner door lower portion is capable of being raised and lowered.

11. The system according to claim 9, further comprising:
wherein interior door is capable of being raised such that an opening is formed providing access to the interior of said grain bin and allowing grain stored within said grain bin to exit through said opening; and
said interior door including at least one sample access opening, said sample access opening adapted to allow access to grain stored within said grain bin for sampling or cleaning purposes.

12. The system according to claim 9, wherein said steps and said platform include safety rails adapted for preventing a user from falling from said steps or from said platform.

13. A method of unloading grain from a grain bin, the method comprising the steps:
providing grain stored in a grain bin;
providing an access panel located in a wall of said grain bin, said access panel including a frame, an interior door, and an exterior door;
wherein said exterior door comprises a weather-proof door hingedly connected to said grain bin wall and capable of sealing said access panel;
providing a pipe chute including a proximal end and an distal end, said pipe chute further comprising a plurality of sections affixed to said grain bin and placed below said access panel;
positioning said pipe chute;
opening said exterior door;
opening said interior door; and
loading grain into a transport vehicle.

14. The method according to claim 13, further comprising the steps:
connecting a funnel to the proximal end of said pipe chute; and
providing a grate mounted to said grain bin below said access panel and above said funnel.

15. The method according to claim 14, further comprising the steps:
providing a hydraulic motor and hydraulic system connected to said plurality of pipe chute sections such that said pipe chute sections may be individually hydraulically controlled by said hydraulic system;
providing a remote control sensor electrically connected to said hydraulic motor and hydraulic system capable of receiving wireless commands from a remote source; and
repositioning said pipe chute based upon said wireless commands.

16. The method according to claim 13, further comprising the step:
affixing said exterior door hingedly connected to said grain bin with a weather-proof and pest-proof seal when said exterior door is in a closed position, and is further adapted for allowing access to said interior door when in an open position;
wherein said interior door includes an upper door portion with an inner face and an outer face, and a lower door portion with an inner face and an outer face, wherein said lower door portion is capable of being raised such that an opening is formed providing access to the interior of said grain bin and allowing grain stored within said grain bin to exit through said opening;
providing at least one sample access opening within said interior door said upper door portion; and
collecting a grain sample through said sample access opening.

17. The method according to claim 16, further comprising the steps:
providing a pair of door tracks affixed to said inner door upper portion outer face;
providing a pair of rails affixed to said inner door lower portion inner face;
engaging said rails with said tracks such that said inner door lower portion is capable of being raised and lowered;
raising said interior door thereby forming an opening and providing access to the interior of said grain bin; and
discharging grain from said grain bin through said opening.

18. The method according to claim 16, wherein said interior door is hingedly connected to said grain bin such that said interior door is capable of opening into the interior space of said grain bin when the level of grain stored within said grain bin is below said interior door.

* * * * *